B. G. GILBOUGH.
PRESSURE GAGE FOR TIRES.
APPLICATION FILED MAY 23, 1917.
1,295,889.
Patented Mar. 4, 1919.
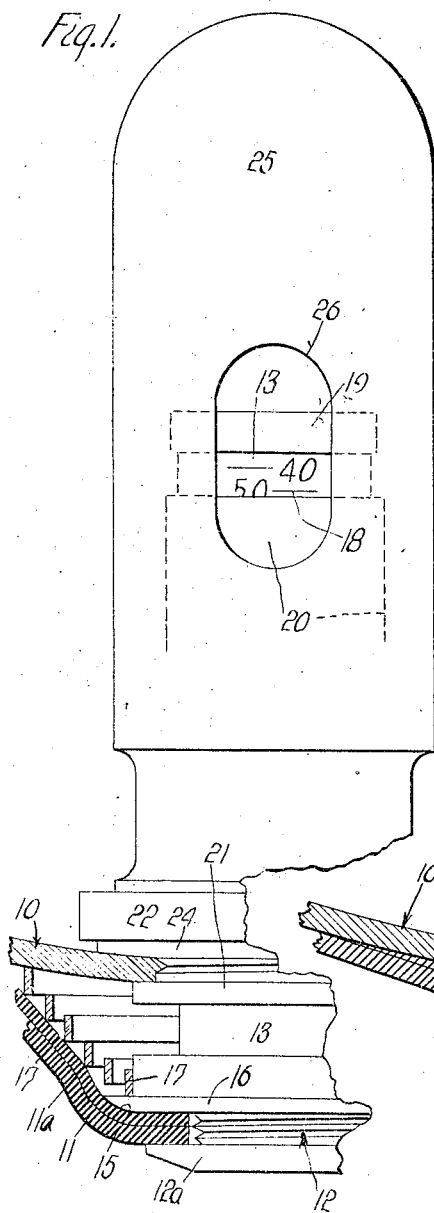
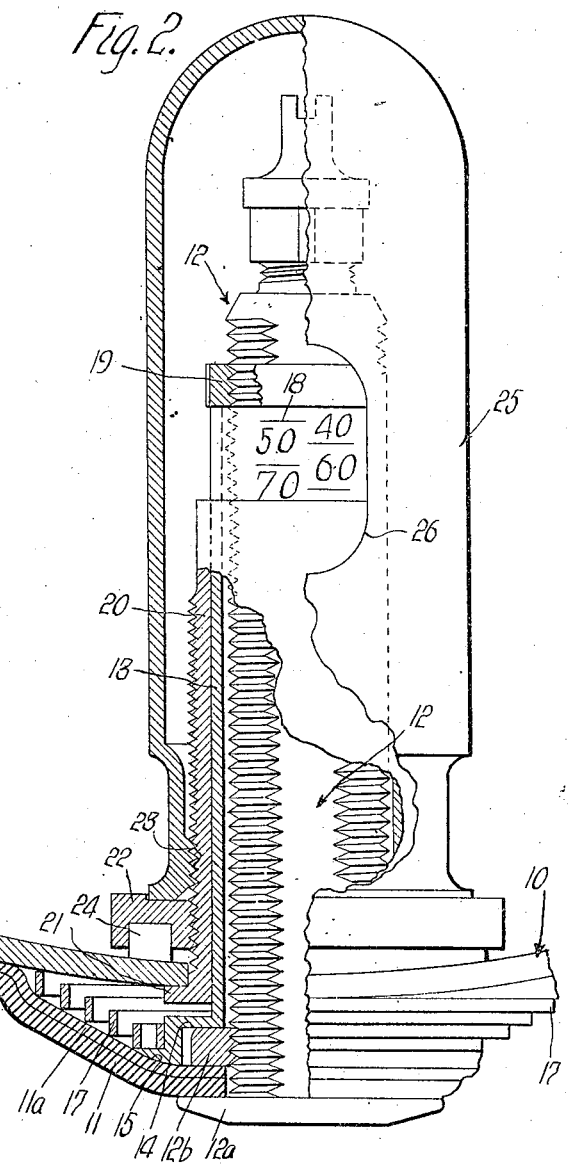
Inventor
Benjamin G. Gilbough,
by James T. Banjulus
his Attorney.

UNITED STATES PATENT OFFICE.

BENJAMIN G. GILBOUGH, OF LOS ANGELES, CALIFORNIA.

PRESSURE-GAGE FOR TIRES.

1,295,889.

Specification of Letters Patent.

Patented Mar. 4, 1919.

Application filed May 23, 1917. Serial No. 170,408.

*To all whom it may concern:*

Be it known that I, BENJAMIN G. GIL-BOUGH, a citizen of the United States, residing at Los Angeles, in the county of Los Angeles, State of California, have invented new and useful Improvements in Pressure-Gages for Tires, of which the following is a specification.

This invention relates to pressure gages for tires; and it is a general object of this invention to provide a simple, reliable and easily applied device which may be applied to a tire and rim to permanently and continuously indicate the inflation pressure in the tire.

In a co-pending application Serial No. 170,409, filed May 23, 1917, I have explained the general and broad aspects of my invention and set forth my claims thereto; and in this present application I set forth a particular form of my device whose distinguishing feature is the use of the valve stem of the tire as the relatively movable element of the pressure indicator. In general, my invention includes two relatively movable members, one of which is connected with the tire wall; and the internal inflation pressure of the tire moves the wall and the movable element in proportion to the inflation pressure.

In my said co-pending application Serial No. 170,409, filed May 23, 1917, I have shown relatively movable elements which merely bear against the exterior surface of the tire wall (the inner tube of the tire); and that is one specific form of my invention. In the present specific form of my invention I utilize the always present valve stem of the tire, opposed in its movement preferably by a spring. This valve stem is of course, permanently secured and attached to the inner tube of the tire. It is a particular advantage of the present specific form that it is only necessary to supply a few single parts which are assembled and used in connection with the valve stem.

In the following specification I describe in detail said specific form of device embodying my invention; referring for this purpose to the accompanying drawings, in which—

Figure 1 is a view showing my device in elevation; and Fig. 2 is a view showing my device in section, applied to a rim and tire. It will be understood that the drawings are about twice the actual size of the device; and that my device is in reality quite small.

In the drawings I show a rim 10. This rim may typify any kind of rim, whether a detachable rim or the rim of a demountable wheel. As will be understood, my device may be applied to any kind of rim or wheel, or felly, or the like. The inner tube of a tire is shown at 11, and the usual valve stem is shown at 12. The valve stem has a head 12ᵃ on its inner end inside the tube 11; and a nut or similar means, as shown at 12ᵇ, holds the valve stem in rigid and permanent connection with the tire wall (the inner tube wall). For the purposes of my invention I fit a sleeve 13 around the valve stem. This sleeve has a shoulder at 14 which bears against the upper surface of the stem nut 12ᵇ; and it has a curved flange surface at 15 against which the inner tube wall 11, or a protector strip 11ᵃ, is adapted to bear. The inner end (the end of the sleeve or tube 13 toward the tire) has a flange 16 which carries one end of the spiral spring 17, the other end of this spring resting against the rim 10. Thus it will be seen that the spring 17 is confined between the rim and the relatively movable element of the gage indicator; the relatively movable element being, in this case, primarily the valve stem 12, but in actual fact the valve stem 12 and the sleeve 13. Sleeve 13 is provided mainly for the purpose of providing a smooth exterior sliding surface for the relatively movable element and also to provide a surface on which the pressure indications 18 may be readily placed. The protector strip 11ᵃ prevents the inner tube from coming into direct contact with the spring 17 and the other parts. The tube 13 is held in place by a nut 19 which screws down onto the upper end of the tube 13 engaging the screw threads of the valve stem; and this nut also serves the purpose of forming a limit stop for the downward movement of the tube 13 and the valve stem, the nut striking the end of exterior sleeve 20.

The movable tube 13 slides in an exterior sleeve 20, rigidly mounted upon the rim 10. This sleeve 20 may have a flange 21 at its inner end; and a nut 22 screws down on screw threads 23 and bears against the rim 10 or bears against a washer 24 against the rim. The upper end of the sleeve 20 becomes a convenient mark by which the pressure designations 18 on tube 13 may be read. The whole device is inclosed within a cap 25, having a window or windows 26 through which the pressure designations may be observed; this cap screwing down against the nut 22 as indicated, or screwing down against the felly of a wheel upon which the rim 10 may be mounted; as the case may be.

The internal inflation pressure of the tire tends to press the tire wall outwardly against the action of the spring 17, which tends to move the tire wall and the movable element of my device inwardly into the tire. The effective pressure area borne and carried by the spring 17 is determined by the size of the indentation into the tire caused by the spring; and this effective pressure area being known, and the strength of the spring being known, the pressure designations 18 may be fixed accordingly. The device then continuously and accurately indicates the internal inflation pressure in the tire; utilizing, like the specific forms described in my said copending application Serial No. 170,409, filed May 23, 1917, the external outward pressure of the tire wall. In the present specific form of device it is not necessary to make an additional hole through the rim upon which the tire is mounted; my device being accommodated by the usual valve stem opening through the rim, or by a slight enlargement of that opening. The device may be applied to the valve stem of any tire; it is only necessary to apply the extra parts herein described.

Within the limitations herein indicated and set forth by the following claims, I believe my invention to be broad in its nature and scope; and I therefore do not limit myself to specific details of structure and design, as these may be varied without departing from my invention.

Having described a preferred form of my invention, I claim:

1. In combination with a rim and an inflatable tire thereon, a member engaging the tire wall and movable therewith with relation to the rim, means for indicating the amount of said relative movement, and resilient means to resist movement of said member and of the portion of the tire wall surrounding the place where said member engages the wall, embodying a resilient member confined between the tire wall and the rim and substantially conical in formation with its larger end at the rim.

2. In combination with a rim and an inflatable tire thereon, a member engaging the tire wall and movable therewith with relation to the rim, means for indicating the amount of said relative movement, and resilient means to resist movement of said member and of the portion of the tire wall surrounding the place where said member engages the wall, embodying a cone shaped spring having its larger end at the rim and its smaller end near the place where said member engages the tire wall, and a protector piece between the spring and the tire wall.

3. In combination with a rim and an inflatable tire thereon, a member extending and movable radially through the rim with its inner end engaging the tire wall and movable by the inflation of the tire, means to indicate the amount of movement of said member, and a cone shaped spring surrounding the movable member and lying between the tire wall and the rim to support said member and the surrounding portion of the tire wall and resist inflation movement of said member and the surrounding portion of the tire wall.

4. In combination with a rim and an inflatable tire thereon, a valve-stem attached to the tire wall and extending and movable radially through the rim, a sleeve surrounding and mounted on the valve stem to move therewith, a sleeve mounted on the rim and through which the valve-stem sleeve extends and slides, and a spring surrounding the valve-stem sleeve and confined between the rim and the end of the sleeve at the tire wall.

5. In combination with a rim and an inflatable tire thereon, a valve-stem attached to the tire wall and extending and movable radially through the rim, a sleeve surrounding and mounted on the valve stem to move therewith, a sleeve mounted on the rim and through which the valve-stem sleeve extends and slides, and a cone shaped spring surrounding the valve stem sleeve and confined between the rim and the end of the sleeve at the tire wall, the larger end of the spring being at the rim, whereby said valve-stem and its sleeve and also the portion of the tire wall surrounding the valve stem are resiliently supported against inflation movement.

In witness that I claim the foregoing I have hereunto subscribed my name this 11th day of May, 1917.

BENJAMIN G. GILBOUGH.